United States Patent [19]

Wagner et al.

[11] Patent Number: 4,684,101

[45] Date of Patent: Aug. 4, 1987

[54] QUICK CHANGE MOLD INSERT

[75] Inventors: Earl F. Wagner, Alexandria; Charles M. Smith, Anderson, both of Ind.

[73] Assignee: General Motors Corporation, Detroit, Mich.

[21] Appl. No.: 794,589

[22] Filed: Nov. 4, 1985

Related U.S. Application Data

[63] Continuation-in-part of Ser. No. 737,730, May 28, 1985, abandoned.

[51] Int. Cl.$^4$ .................... B29C 39/26; B29C 45/26
[52] U.S. Cl. .................... 249/144; 164/340; 249/151; 425/192 R; 425/193; 425/542; 425/577
[58] Field of Search ............... 249/142, 47, 151, 155, 249/146, 144, 147; 425/182, 190, 192 R, 577, 191, 542, 193; 403/247, 252, 261, 374; 164/340

[56] References Cited

U.S. PATENT DOCUMENTS

| | | | |
|---|---|---|---|
| 152,301 | 6/1874 | Merwin | 249/151 |
| 280,769 | 7/1883 | Snediker | 249/142 |
| 1,103,039 | 7/1914 | Cudell | 249/142 |
| 2,161,521 | 6/1939 | McWane | 164/340 |
| 2,519,171 | 8/1950 | Bolton | 249/142 |
| 3,060,509 | 10/1962 | McCubbins | 425/577 |
| 3,074,112 | 1/1963 | Specht | 249/142 |
| 3,074,113 | 1/1963 | Bobrow | 249/142 |

*Primary Examiner*—Willard E. Hoag
*Attorney, Agent, or Firm*—Lawrence B. Plant

[57] ABSTRACT

An injection molding mold including an insert in-part defining the mold cavity and readily accessible for replacement from the side of the mold. The insert has a molding head at the mold cavity, a shank extending into a socket in the mold, a mortice in the shank for receiving a retainer to hold the insert in place and, preferably, a camming surface on the end of the shank for dislodging the insert from the mold. The retainer will preferably be a sliding pin having a bifurcated keeper portion providing two tapered prongs engaging opposed slots on the insert's shank for holding the insert in place during molding and subsequently for camming the insert loose from the socket at replacement time.

1 Claim, 7 Drawing Figures

QUICK CHANGE MOLD INSERT

This is a continuation-in-part of application, Ser. No. 737,730, filed 5/28/85 and now abandoned.

This invention relates to injection molding molds having replaceable inserts (e.g., cores) in part defining the molding cavity.

BACKGROUND OF THE INVENTION

Many injection molding molds are provided with replaceable inserts (e.g., cores or the like) which permit changing certain mold cavity detail(s) without replacing the entire mold. Hence, the use of inserts can reduce the number of individual molds required for molding a family of similar parts as well as reduce the handling and storage requirements for such extraneous molds. Heretofore replacement or exchanging of the inserts has been unnecessarily cumbersome and time consuming. In this regard, some mold designs (e.g., see mold member 2 of FIG. 1) have required that the mold be completely removed from the molding machine to effect replacement of the insert. Other mold designs (e.g., see mold member 4 of FIG. 1) do not require that the mold be removed from the molding machine but require: (1) the use of a molding machine which has a clamping section which can open wide enough to permit the operator to work on the insert via the mold cavity; and (2) additional manipulations in order to isolate the insert's retainer (i.e., mounting bolt) from the mold cavity, lest it's presence affect the molding operation.

It is an object of the present invention to provide the molding cavity of an injection molding mold with a replaceable insert which is readily accessible and releasable through a sidewall of the mold without removing the mold from the machine or the need for isolating the insert's retainer from the mold cavity. It is another object of the present invention to provide such an insert with a retainer which engages the insert via a passage through a sidewall of the mold and so as to cam the insert tightly into place in the mold. It is a still further object of the present invention to provide such insert with a retainer which serves not only to anchor the insert within the mold but also to free the insert from the mold at replacement time. These and other objects and advantages of the present invention will become more readily apparent from the detailed description thereof which follows.

BRIEF DESCRIPTION OF THE INVENTION

The invention comprehends an injection molding mold including at least two movable mold members which coact in a mold closed position to define a molding cavity for shaping a molded article wherein at least one of the mold members includes a readily replaceable insert accessible through the sidewall of the mold for anchoring it in place and releasing it for removal. The insert bearing mold member has a socket formed therein including a mouth portion adjacent the molding cavity which is wider than the remainder of the socket and defines a seat receiving the head of a mold insert. The mold insert has a molding head portion which tightly fits into the seat in the socket and in-part defines the molding cavity. A shank portion extends from the molding head into the socket for anchoring the insert firmly therein. The shank portion includes at least one mortice for receiving a retainer to provide the anchoring. A passage is provided between the socket and an exterior sidewall of the mold member for access to the insert by the retainer. Removal and replacement of the insert is effected simply by displacing the retainer from the mortice via the passage and thereafter freeing and manually removing the insert from the socket through the mold cavity.

According to a preferred embodiment of the invention the shank portion of the insert will include two mortices in the form of slots on opposite sides of the shank. The mortices each include an anchoring surface against which the retainer acts, in a camming fashion, to draw the molding head down tightly into the seat in the socket. The preferred retainer will comprise an axially slidable pin conforming substantially to the cross-sectional shape of the passage in the mold member and include a bifurcated keeper proportion having two tapered tenons which engage the anchoring surfaces of the slots/mortices so as to provide the aforesaid camming action which draws the insert tightly into place in the socket.

In a most preferred embodiment of the invention, the shank portion of the insert will also include a camming surface on the end thereof opposite the molding head. This camming surface is engageable by an appropriate wedge-shaped release tool applied thereagainst via the access passage between the socket and the sidewall of the mold. Tapping of the release tool while in engagement with the camming surface serves to cam the insert free of its tight fit with the socket and ready it for manual removal by the operator via the molding cavity. The retainer pin will most preferably also serve as the release tool. In this regard the retainer will comprise an invertible tapered pin so shaped and dimensioned that the tapered keeper portion thereof serves to anchor the insert in place when in its normal (e.g., upright) position and, upon inversion thereof, also serves to loosen, dislodge or otherwise free the insert from the seat for manual removal from the socket.

DETAILED DESCRIPTION OF SPECIFIC EMBODIMENT OF THE INVENTION

The invention will be better understood by consideration thereof with reference to certain specific embodiments thereof which are described in detail hereafter in conjunction with the several figures wherein.

Figure 1:
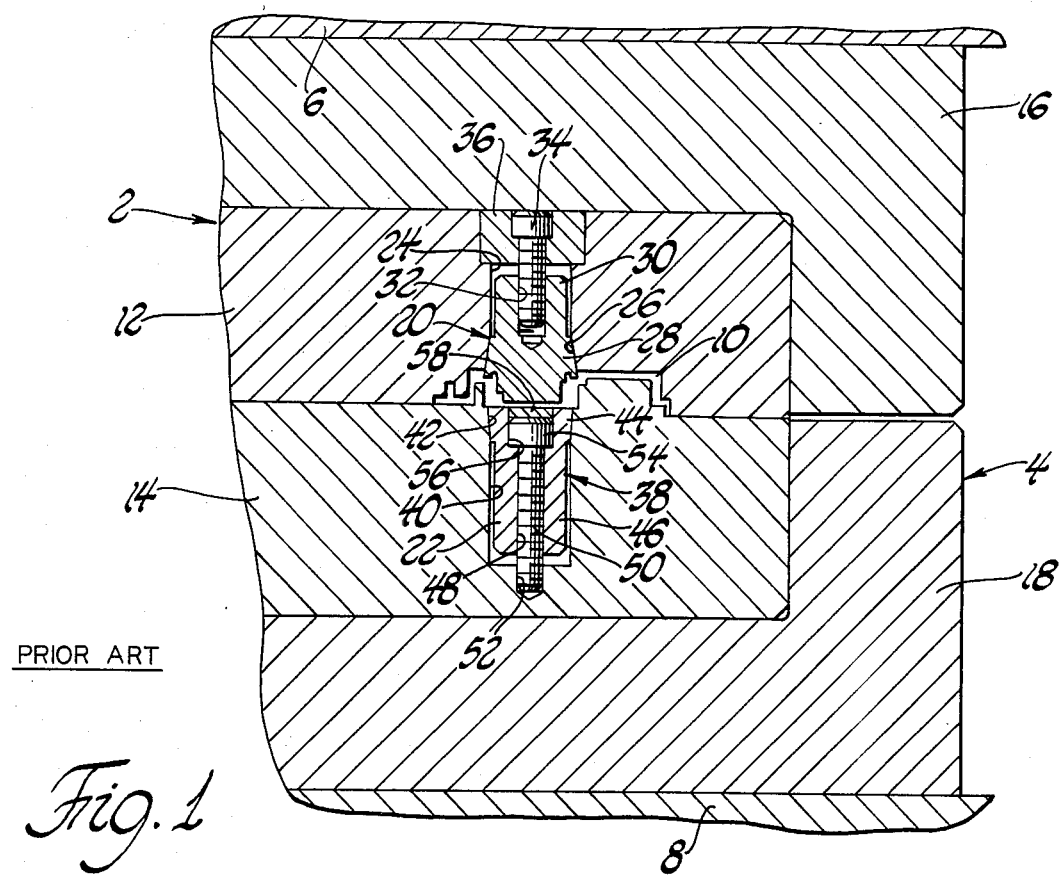
FIG. 1 is a sectional view of an injection molding mold in the closed position depicting two prior art techniques for securing mold inserts within a mold.

FIG. 1 depicts the two typical ways in which prior art mold inserts have been retained within the mold members. An injection molding mold comprises a first mold member 2 and a second mold member 4 mounted to platens 6 and 8, respectively, in the clamping section of an injection molding machine. In actual practice, the mold would be rotated 90° so that the mold opens along a vertical parting line so that the molded part can fall freely from the mold. The mold members 2 and 4 depicted are of the so-called "inserted die" type wherein the molding cavity 10 is formed between die portions 12 and 14 each mounted in die retainer plates 16 and 18, respectively. It is to be understood, however, that the invention hereof would be equally applicable if the die portions 12 and 14 were integral with their respective retainer plates 16 and 18 (i.e., made from a single piece of metal). Mold member 2 includes a socket 24 in the die 12 which socket has a mouth portion at the end thereof opening into the mold cavity 10 defining a tapered seat 26. An insert 20 includes a head portion 28 which fits snugly within the seat 26 of the socket 24 and has a shank portion 30 which extends deeper into the socket 24. The shank portion 30 includes an internally threaded bore 32 for receiving a retainer bolt 34 held in a retainer block 36. In this design, replacement of the insert 20 requires removal of at least the die portion 12 from the machine to provide access to the bolt 34 for removal and replacement of the insert 20.

Mold member 4 on the other hand shows a replaceable insert 38 fitted into a socket 40 which has a seat 42 for receiving the insert's molding head 44. The insert 38 also has a shank portion 46 which extends deeper into the socket 40. A bore 48 extending through the center of the insert 38 receives a bolt 50 which passes therethrough and threads into an internally threaded bore 52 in the bottom of the die 14. In this embodiment, the head 54 of the bolt 50 lies deep within a recess 56 formed in the molding head 44 and which recess 56 is subsequently plugged with a material (e.g., solder) 58 having a higher melting point than the operating temperature of the mold. Replacement of inserts anchored in the mold according to this design requires removal of the plug 58 to provide access to the bolt head 54, requires a wide-opening molding machine to provide direct access to the bolt head 54 for removal and replacement of the plug 58 and requires machining/finishing of the plug after insert replacement to insure that the resulting cavity-side surface of the molding head 54 does not affect the quality of the molded part.

Figure 2:
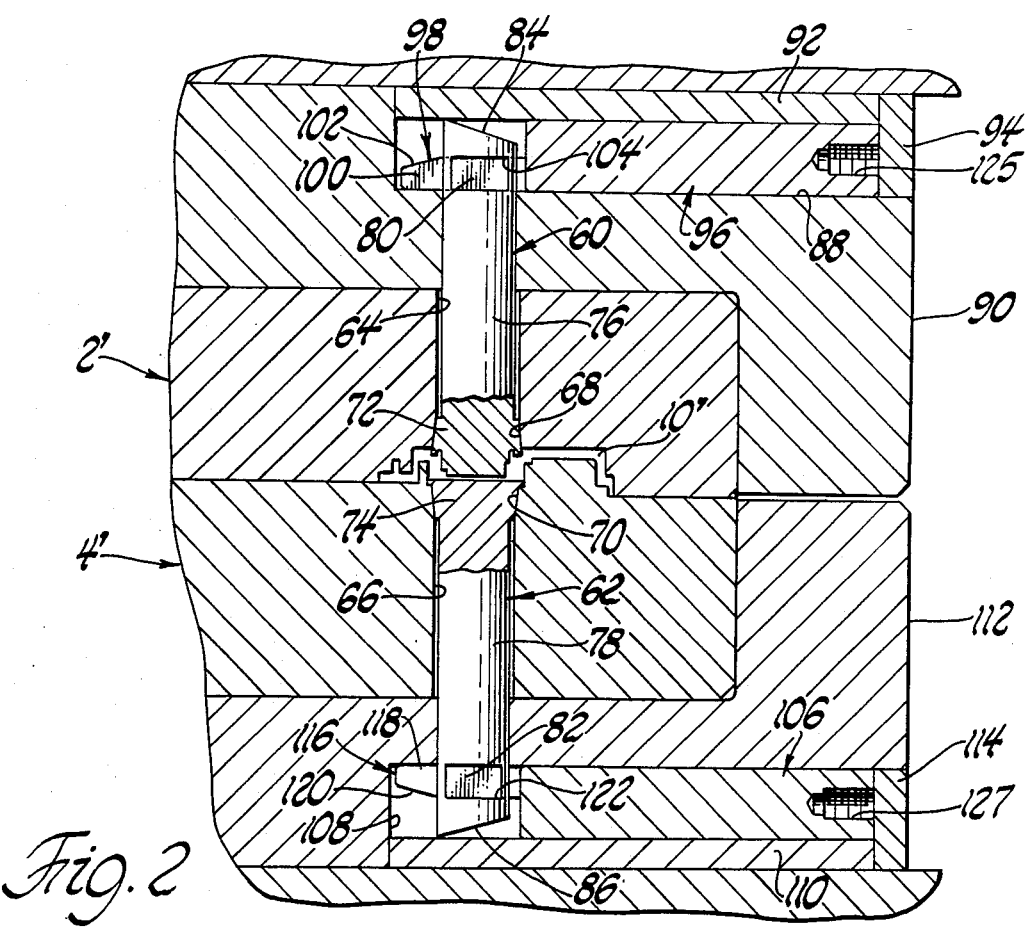
FIG. 2 is primarily a sectional view of an injection molding mold in the closed position illustrating a quick change insert (in partial elevation) made in accordance with the present invention anchored in place for molding.
Figure 4:
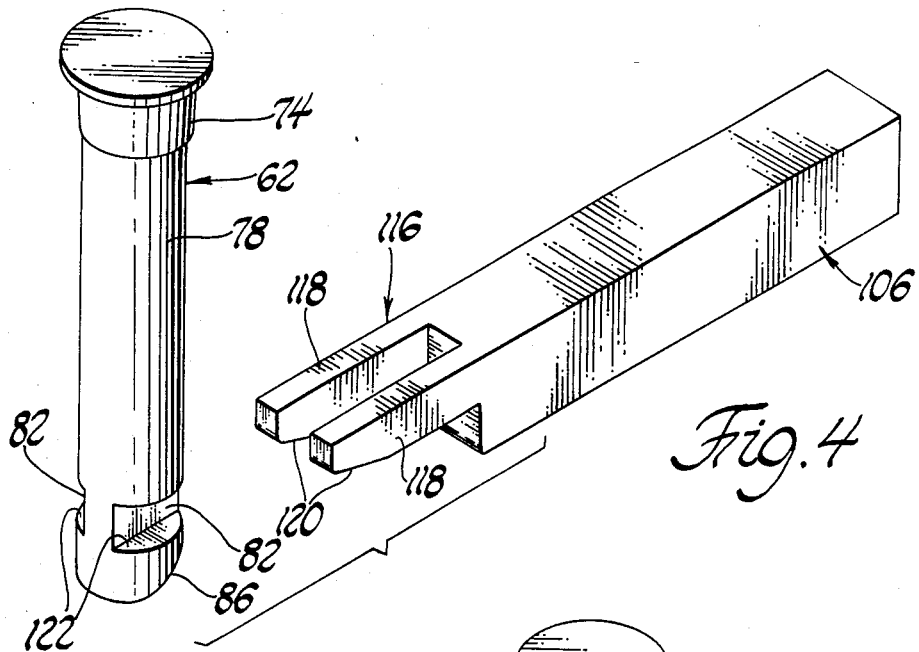
FIG. 4 is a perspective view of the mold insert and retainer pin of FIGS. 2 and 3.

FIG. 2 depicts an injection molding mold with quick change replaceable inserts in accordance with a preferred embodiment of the present invention. The mold members 2' and 4' each include a replaceable insert 60 and 62 respectively. The inserts 60 and 62 are positioned in sockets 64 and 66 respectively each of which in turn includes a seat 68 or 70, respectively, adjacent the mold cavity 10'. The inserts 60 and 62 each include a molding head 72 and 74, respectively, which complement the shape of the seats and fit tightly within their corresponding socket seats 68 and 70. The inserts 60 and 62 also include shank portions 76 and 78 respectively which have a girth less than their corresponding heads 72 and 74 and project deeper into the sockets 64 and 66 respectively. The shanks 76 and 78 have slot-like mortices 80 and 82 cut therein (best shown in FIG. 4) and include camming surfaces 84 and 86, respectively, on the ends thereof opposite the molding head portions 72 and 74 for facilitating the loosening or dislodging of the inserts 60 and 62 from their respective sockets 64 and 66.

A passage 88 is provided in the mold member 2 and extends between the socket 64 and the exterior sidewall 90 to provide access to the mortices 80 in the insert 60 from the side of the mold. A cover plate 92 closes off one side of the passage 88 while an access plate 94 seals off the end thereof at the side of the mold to keep it free from debris while at the same time serving to hold an insert retainer pin 96 in place. The retainer pin 96 is axially slidable in and out of the passage 88 and includes a bifurcated keeper portion 98 comprising tapered prongs 100 which engage the mortices 80 of the insert 60 for holding the insert 60 tightly in the socket 64. In this regard, the prongs 100 each include a wedging surface 102 which act upon anchoring surface 104 of mortices 80 to cam or wedge the insert 60 tightly in the socket 64.

Similarly, the insert 62 in the lower mold member 4 is held firmly within the socket 66 by retainer pin 106 in essentially the same manner as described above in conjunction with retention of the insert 60 in the socket 64. In this regard, a slot 108 in the backside of the mold member 4 is covered with the cover plate 110 to provide the passage which communicates the socket 66 with the exterior sidewall 112 of the mold member. An access plate 114 closes off the end of the passage/slot 108 and holds the retainer pin 106 in place. The retainer pin 106 has a bifurcated keeper portion 116 (i.e., providing two tapered prongs 118) on the end thereof for engaging the mortice 82 in the shank 78 of the insert 62. The tapered prongs 118 have wedging surfaces 120 thereon for cammingly engaging anchoring surfaces 122 of the mortices 82 for drawing the insert 62 down tightly into the socket 66.

Figure 3:
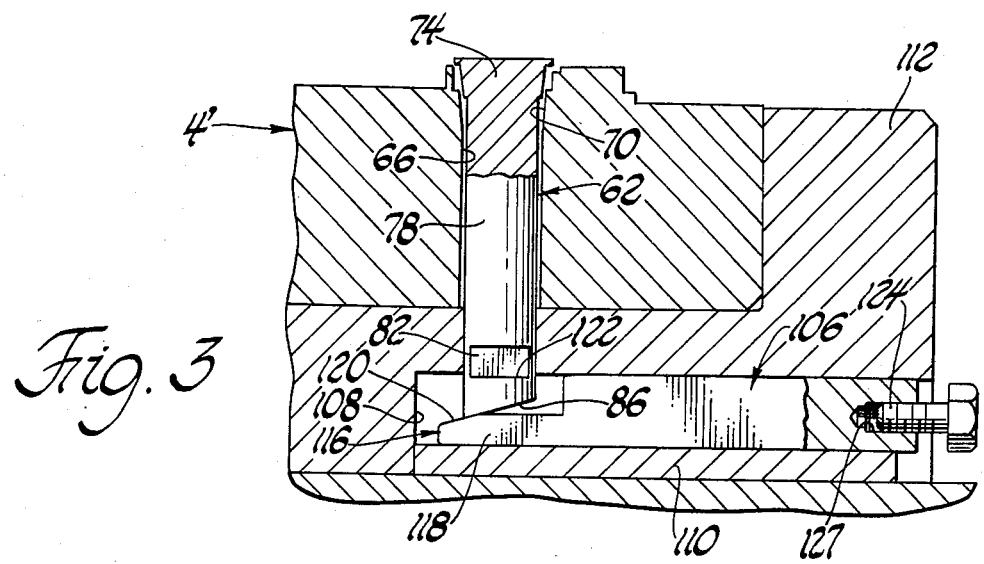
FIG. 3 is primarily a sectional view of the lower mold member of FIG. 2 illustrating the quick change insert (in partial elevation) of the present invention as it is being freed from the mold.

Removal of the inserts 60 or 62 from their respective mold members is accomplished in the following manner. The access plates 94 and 114 are removed and a headed bolt 124 threaded into threaded recesses 125 and 127 on the backsides of the retainer pins 96 and 106 (see FIG. 3). The bolt 124 is grasped by an appropriate tool and the retainer pins withdrawn to disengage the prongs 100 and 118 from the mortices 80 and 82. A wedge-like releasing tool is then inserted through the passages to engage the camming surfaces 84 and 86. Tapping on the releasing tool effectively frees the insert from its tight fit in the socket and permits its ready manual removal from the mold through the mold cavity 10'. Preferably, the retainer pins 96 and 106 also serve as the release tools. To this end the pins 96 and 106 are completely withdrawn from the passages 88 and 108 and inverted so that the wedging surfaces 102 and 120 on the prongs 100 and 118 can now engage the camming surfaces 84 and 86 on the ends of the shanks 76 and 78 which project into the passages 88 and 108 from the sockets 64 and 66. Insertion of the pins 96 and 106 all the way into the passages causes the wedging surfaces 102 and 120 to act against the camming surfaces 84 and 86 to free the inserts from their nests and provide sufficient elevation thereof out of their sockets to permit the operator to manually remove them the rest of the way. Following replacement of the inserts the inverted retainer pins are removed from their passages, returned to their original upright position, repositioned in their respective passages and tapped into tight engagement with the mortices as described above.

Figure 5:
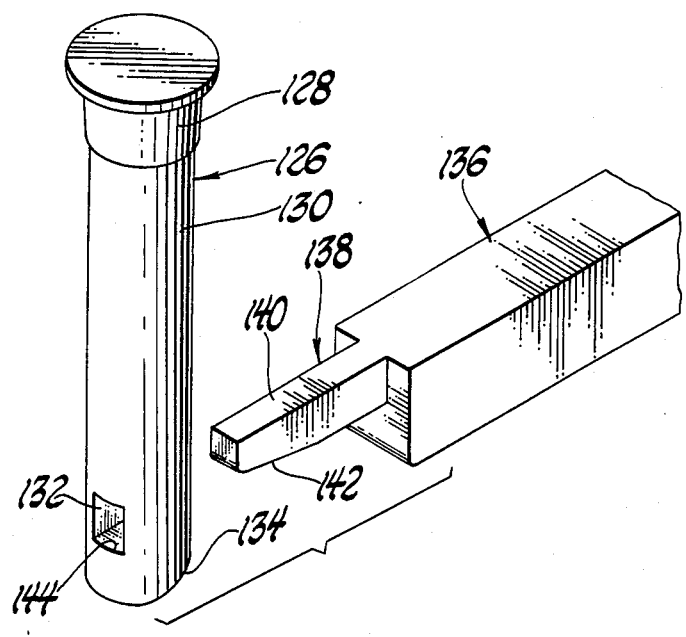
FIG. 5 is a perspective view of an alternative embodiment of a mold insert and retainer pin.

FIG. 5 is an alternative embodiment wherein an insert 126 has a molding head portion 128, a shank portion 130, a mortice 132 (i.e., aperture through the center of the shank 130) and a camming surface 134 akin to the camming surfaces 84 and 86 described above. In this embodiment, the retaining pin 136 has a keeper end 138 comprising a single prong 140 having a wedging surface 142 (i.e., akin to the wedging surfaces 102 and 120 described above) for engaging anchoring surface 144 defining the mortice 132.

Figure 6:
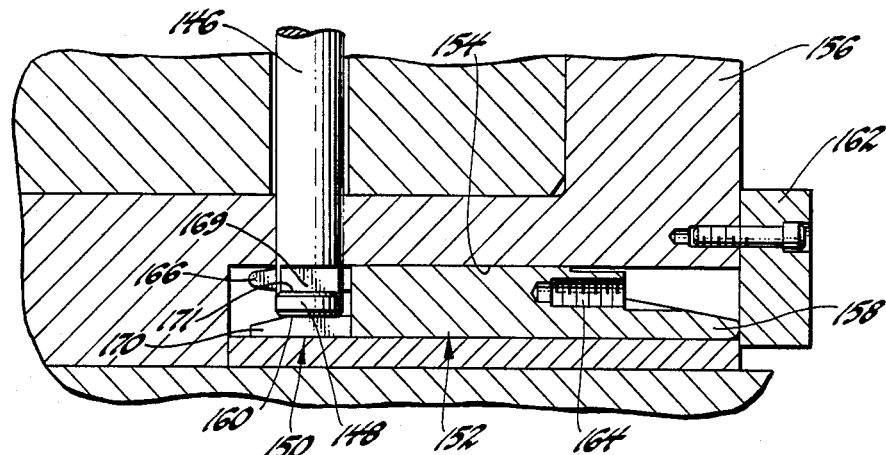
FIG. 6 is a sectional view of a portion of an injection molding mold illustrating a quick change mold insert and retainer pin in accordance with another embodiment of the present invention.
Figure 7:
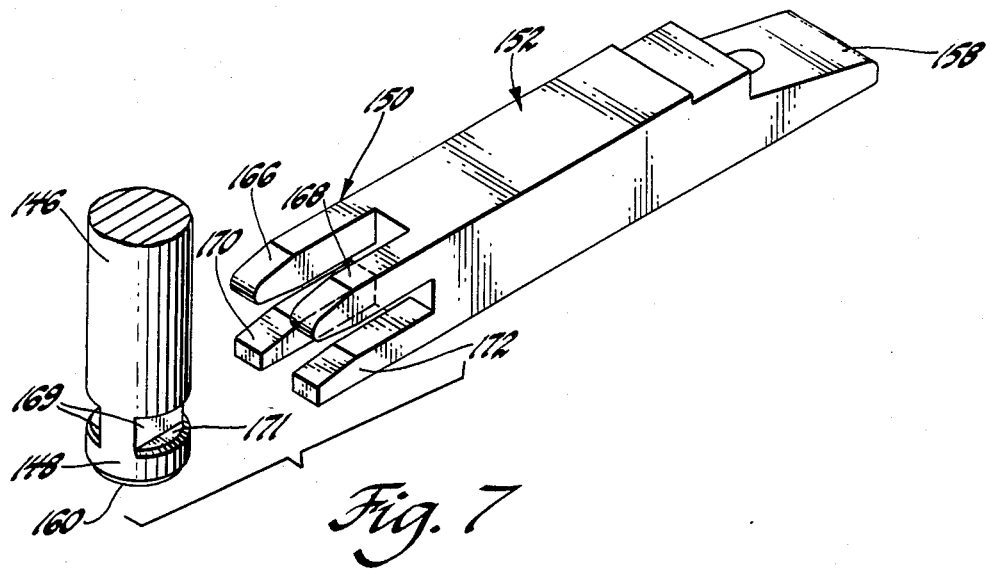
FIG. 7 is a perspective view of the quick change mold insert and retainer pin of FIG. 6.

FIG. 6 is a view of another embodiment of the present invention and similar to that of FIG. 2. More specifically, FIG. 6 shows an insert shank portion 146 having a knob 148 on the end thereof engaged by a four-pronged end 150 of a retainer pin 152 fitted into passage 154 in the mold member 156. Two prongs 166 and 168 mate with the mortises 169 so as to engage the topside 171 of the knob 148 and hold it firmly in the socket while two additional prongs 170 and 172 engage the underside 160 of the knob 148 to help support the insert. The other end of the retainer pin 152 includes a wedge-like projection 158 for releasing the insert from the mold by engaging the underside 160 of the knob 148 and camming it upwardly (i.e., as the drawings are oriented) in the same manner as described above in connection with the prongs 100 and 118 of the embodiment shown in FIGS. 2-4 and prong 140 of FIG. 5 An access plate 162 is bolted to the mold member 156 so as to close off the passage 154 and hold the retainer pin 152 in place during molding. Removal of the plate 162 permits access to the pin 152 via a bolt (not shown) which engages the internal threads 164 in the pin 152 adjacent the projection 158 and permits ready removal of the pin 152 in the same manner as discussed above in connection with bolt 124 of FIG. 3. After the pin has been extracted from the passage 154 it is simply rotated 180 degrees end-to-end so that the projection 158 enters the passage 154 first, engages the underside 160 of the knob 148 and frees the insert.

While the invention has been described primarily in terms of specific embodiments thereof it is not intended to be limited thereto but rather only to the extent set forth hereafter in the claims which follow.

The embodiments of the invention in which an exclusive property or privilege is claimed are defined as follows:

1. A mold adapted for mounting in an injection molding machine comprising:
    first and second relatively movable mold members coacting in a mold-closed position to define a molding cavity for shaping a molded article, at least one of said members having a sidewall which is readily accessible to a machine operator from the exterior of the mold without removing the mold from the machine;
    a socket in said one mold member opening into said cavity, said socket having a mouth portion contiguous said cavity which is wider than the remainder of the socket and defines a seat receiving the head of a mold insert;
    a replaceable mold insert in said socket for changing the mold cavity detail as desired;
    a molding head on one end of said insert having a shape complementary to said seat, said head being nested in said seat and in-part defining said cavity;
    a shank extending from said head into the remainder of said socket, said shank having a girth less than said head;
    a camming surface on the end of said shank opposite said head for dislodging said insert from said socket when engaged by an appropriate tool;
    at least one mortice in said shank proximate said camming surface said mortice being defined in part by an anchoring surface;
    a passage in said one member extending between said socket and said sidewall and providing access to said mortice and camming surfaces; and
    an invertible retaining pin slidable within said access passage to secure said molding head fixedly within said seat throughout a plurality of successive molding cycles, said pin having a wedging surface thereon for engaging said anchoring surface and drawing said head tightly into said seat when said pin is oriented in a first position and subsequently engaging said camming surface for dislodging said insert from said socket when said pin is inverted relative to said first position.

* * * * *